US012386136B2

(12) United States Patent
Jhang et al.

(10) Patent No.: US 12,386,136 B2
(45) Date of Patent: Aug. 12, 2025

(54) HEAD-MOUNTED DISPLAY DEVICE

(71) Applicant: HTC Corporation, Taoyuan (TW)

(72) Inventors: Jhih-Ming Jhang, Taoyuan (TW);
Wei-Cheng Liu, Taoyuan (TW);
Chun-Lung Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 444 days.

(21) Appl. No.: 18/082,585

(22) Filed: Dec. 16, 2022

(65) Prior Publication Data

US 2024/0053570 A1   Feb. 15, 2024

Related U.S. Application Data

(60) Provisional application No. 63/396,609, filed on Aug. 10, 2022.

(51) Int. Cl.
*G02B 7/02* (2021.01)
*G02C 7/08* (2006.01)
*G06F 1/16* (2006.01)

(52) U.S. Cl.
CPC ............... *G02B 7/02* (2013.01); *G02C 7/081* (2013.01); *G06F 1/163* (2013.01)

(58) Field of Classification Search
CPC .... G02B 7/02; G02B 7/04; G02B 2027/0178; G02B 27/0176; G02B 27/0172; G02C 7/081; G02C 7/02; G02C 7/08; G06F 1/163
USPC ........................................................ 359/703
See application file for complete search history.

(56) References Cited

U.S. PATENT DOCUMENTS

| | | | |
|---|---|---|---|
| 4,695,129 A | 9/1987 | Faessen et al. | |
| 8,605,008 B1 | 12/2013 | Prest et al. | |
| 10,863,637 B1* | 12/2020 | Pickett | H05K 5/0204 |
| 11,774,705 B1* | 10/2023 | Ebert | G02B 27/0176 |
| | | | 345/8 |
| 2015/0253574 A1* | 9/2015 | Thurber | G02B 27/0172 |
| | | | 359/630 |
| 2018/0338130 A1* | 11/2018 | Miller | H04N 13/327 |
| 2019/0041899 A1* | 2/2019 | Ellis | G06F 1/163 |
| 2019/0369660 A1* | 12/2019 | Wen | G06F 1/163 |
| 2020/0241611 A1* | 7/2020 | Allin | G06F 1/20 |
| 2020/0409150 A1* | 12/2020 | Lee | G02B 7/02 |

(Continued)

FOREIGN PATENT DOCUMENTS

| | | |
|---|---|---|
| CN | 104570355 | 4/2015 |
| CN | 14415373 | 4/2022 |

OTHER PUBLICATIONS

"Office Action of Taiwan Counterpart Application", issued on Sep. 4, 2023, p. 1-p. 5.

*Primary Examiner* — William R Alexander
(74) *Attorney, Agent, or Firm* — JCIPRNET

(57) ABSTRACT

A head-mounted display device includes a body, two adjustment rings, and a face gasket. The body has two zoom lens groups corresponding to both eyes. The two adjustment rings are used to be detachably assembled to the corresponding zoom lens group, respectively. The face gasket is used to be detachably assembled to the body and used to contact a user's face. The face gasket has two adjustment knobs. Each of the adjustment knobs is used to couple the corresponding adjustment ring and rotate the corresponding zoom lens group for zooming, and a part of the each of the adjustment knobs is exposed to the outside for the user to manipulate.

6 Claims, 3 Drawing Sheets

(56) References Cited

U.S. PATENT DOCUMENTS

| | | | |
|---|---|---|---|
| 2021/0278875 A1* | 9/2021 | Allin | G02B 27/0176 |
| 2021/0405396 A1* | 12/2021 | Ma | G02C 9/02 |
| 2023/0276595 A1* | 8/2023 | Moghaddam | H10K 50/87 |
| | | | 361/695 |

* cited by examiner

HEAD-MOUNTED DISPLAY DEVICE

CROSS-REFERENCE TO RELATED APPLICATION

This application claims the priority benefit of U.S. provisional application Ser. No. 63/396,609, filed on Aug. 10, 2022. The entirety of the above-mentioned patent application is hereby incorporated by reference herein and made a part of this specification.

BACKGROUND

Technical Field

This application relates to a display device, and in particular to a head-mounted display device.

Description of Related Art

With the rapid progress of current technology, the types and functions of head-mounted display devices are becoming more and more diversified. For example, when a user wears this type of head-mounted display device, the gyroscope and position tracker inside the head-mounted display device will track the user's movement to project corresponding scene images, providing the user with a virtual world experience.

When using a head-mounted display device, since each user has a different degree of myopia, two zoom lens groups in the head-mounted display device are available to suit different users so that each user can get the best experience. Currently, head-mounted display devices mainly use manual zooming of the zoom lens groups. However, the installation of a face gasket for comfort and stability prevents the user from touching the zoom lens groups for zooming.

SUMMARY

This application provides a head-mounted display device, which may improve a problem that a face gasket obstructs zooming.

The head-mounted display device of this application includes a body, two adjustment rings, and a face gasket. The body has two zoom lens groups corresponding to both eyes. The two adjustment rings are used to be detachably assembled to a corresponding one of the zoom lens groups, respectively. The face gasket is used to be detachably assembled to the body and used to contact a user's face. The face gasket has two adjustment knobs. Each of the adjustment knobs is used to couple a corresponding one of the adjustment rings and rotate a corresponding one of the zoom lens groups for zooming, and a part of the each of the adjustment knobs is exposed to the outside for the user to manipulate.

Based on the above, in the head-mounted display device of this application, the face gasket has adjustment knobs so that the user may perform zooming by the adjustment knobs.

DESCRIPTION OF THE EMBODIMENTS

Figure 1:
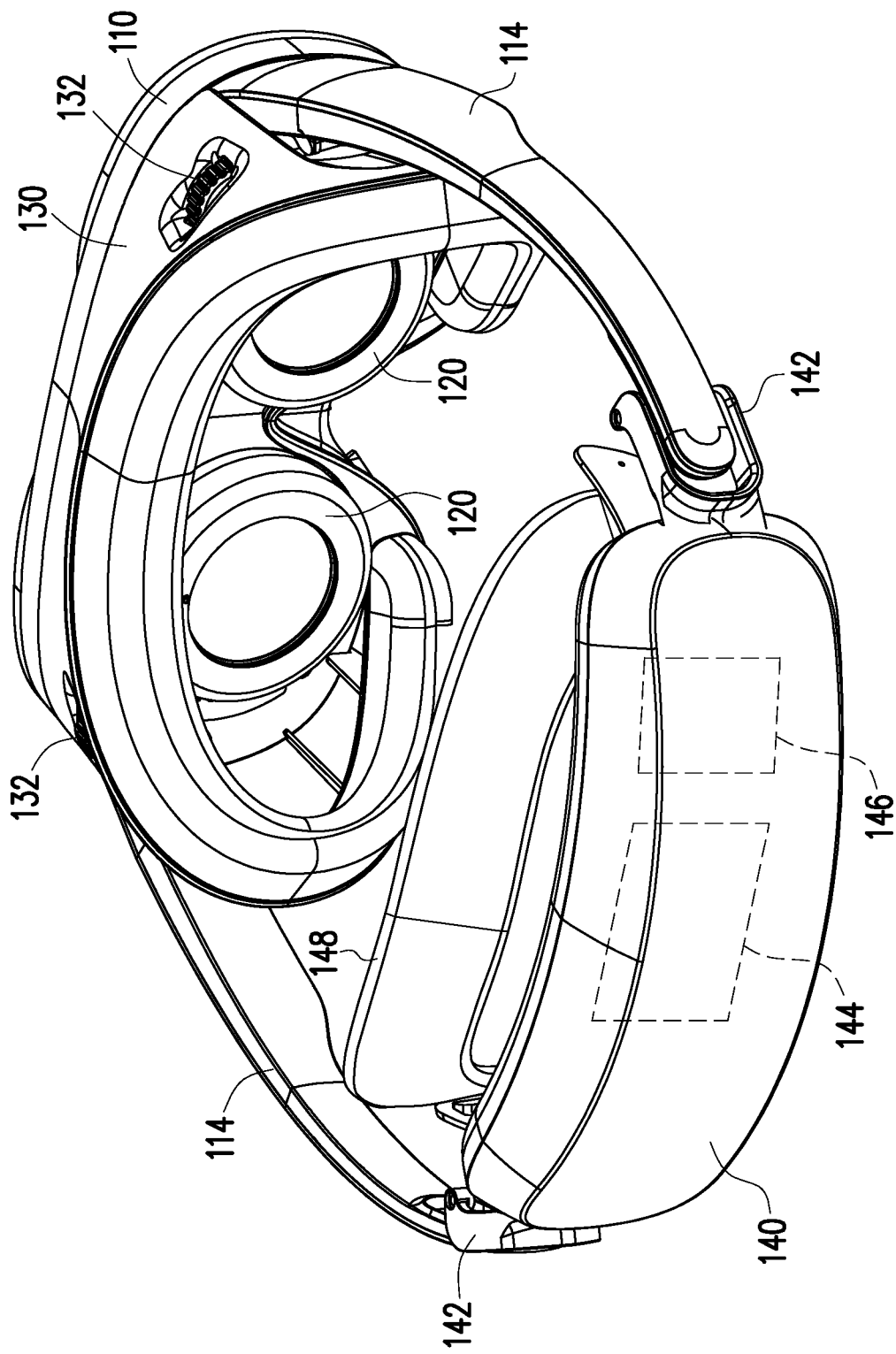
FIG. 1 is a schematic diagram of an assembled state of a head-mounted display device of an embodiment of the invention.
Figure 2:
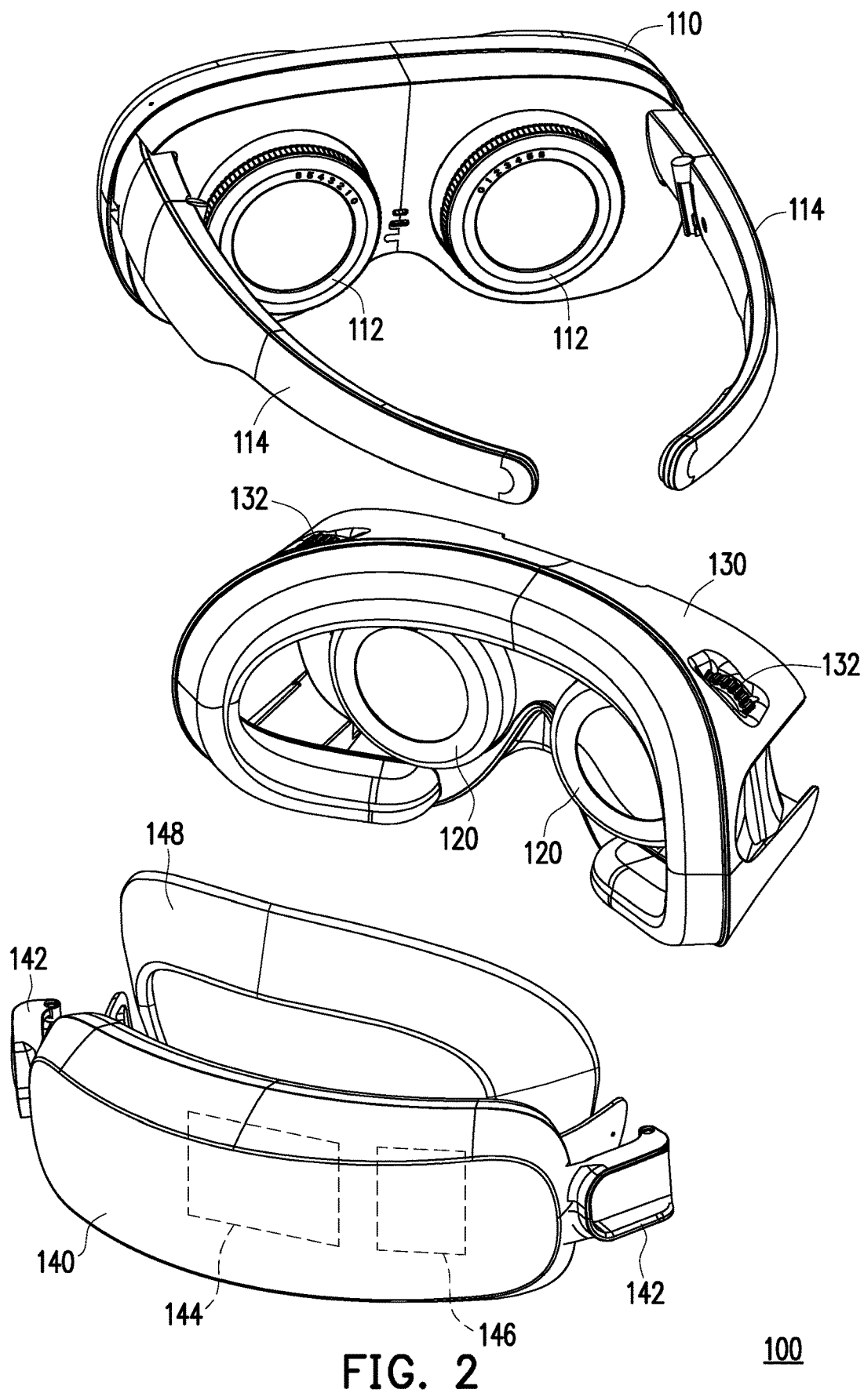
FIG. 2 is a schematic diagram of a disassembled state of the head-mounted display device in FIG. 1.

FIG. 1 is a schematic diagram of an assembled state of a head-mounted display device of an embodiment of the invention. FIG. 2 is a schematic diagram of a disassembled state of the head-mounted display device in FIG. 1. Referring to FIG. 1 and FIG. 2, a head-mounted display device 100 of this embodiment includes a body 110, two adjustment rings 120, and a face gasket 130. The body 110 has two zoom lens groups 112 corresponding to both eyes. The two adjustment rings 120 are used to be detachably assembled to a corresponding one of the zoom lens groups 112, respectively. The face gasket 130 is used to be detachably assembled to the body 110 and used to contact a user's face. The face gasket 130 has two adjustment knobs 132. Each of the adjustment knobs 132 is used to couple a corresponding one of the adjustment rings 120 and a corresponding one of the zoom lens groups 112 for zooming, and a part of the each of the adjustment knobs 132 is exposed to the outside for the user to manipulate.

In this embodiment, the face gasket 130 is detachably assembled to the host 110. As a result, when the user uses the head-mounted display device 100 in a static usage situation, the face gasket 130 may be removed to reduce weight in favor of another lightweight face gasket. On the other hand, when the user uses the head-mounted display device 100 in a situation where there may be intense movements, or when using the head-mounted display device 100 in an immersive situation that requires isolation from the outside world, the face gasket 130 may be assembled to the body 110, which not only improves the stability when wearing the head-mounted display device 100, but also reduces interference and provides a better immersive experience by blocking out external light.

In addition, in the head-mounted display device 100 of this embodiment, the two zoom lens groups 112 may zoom independently. When the user has a myopia problem, the zoom lens groups 112 may be zoomed to get a clear image. Moreover, even if the user's eyes have different degrees of myopia, the two zoom lens groups 112 may be individually zoomed to different degrees, so that both eyes can get a clear image. When the face gasket 130 is not assembled to the host 110, the user may directly touch and rotate the zoom lens groups 112 to perform zooming. When the face gasket 130 is assembled to the host 110, the user may still touch the part of the adjustment knobs 132 exposed to the outside for the user to manipulate, and the manipulated adjustment knobs 132 may drive the adjustment rings 120 to rotate the corresponding one of the zoom lens groups 112 for zooming. Therefore, the user may conveniently complete the zooming of the zoom lens groups 112 with or without assembling the face gasket 130 to the host 110.

In this embodiment, the host 110 is a lightweight head-mounted display similar to glasses, which may be applied, for example, in the field of virtual reality system, augmented reality system, or mixed reality system. The host 110 may include components such as an optical system and a protective casing, and may be provided with a display or be suitable for placing a display. The display may be a built-in display or an external portable display (e.g., a smartphone, etc.), but the application is not limited thereto. The optical system includes optical elements used to change the light path of the display, such as lenses, light guides, or prisms.

In this embodiment, the head-mounted display device 100 further includes a headband module 140 having two opposite connecting ends 142 used to be detachably assembled to two legs of glasses 114 of the body 110. For example, the connecting ends 142 and the legs of glasses 114 may be connected by hook and loop fasteners or other methods. When the user uses the head-mounted display device 100 in a situation where there may be intense movements, in addition to assembling the face gasket 130 to the body 110, the headband module 140 may also be assembled to the body 110. In this way, the face gasket 130 and the headband module 140 may touch the front and back of the user's head respectively, providing wearing stability and comfort in the way of front and back clamping, close to the feeling of an all-in-one machine. Even if the user has a more intense movement, the head-mounted display device may still be fixed steadily on the user's head, without worrying about dropping or even damaging it.

In this embodiment, a length of the headband module 140 is adjustable. By adjusting the length of the headband module 140, users with different head sizes may comfortably and securely wear the head-mounted display device 100 on their heads. In this embodiment, the headband module 140 further has a built-in battery 144 electrically connected to the host 110. The host 110 itself may have a battery, but such a design also increases the weight of the host 110. Alternatively, the host 110 could be powered by an external power source using a cable, such as a computer or a mobile power source. However, the cable may affect the user's operating experience. With the headband module 140 equipped with the battery 144, the head-mounted display device 100 does not need to be connected to an external power source, which may avoid limiting the user's movements when the user is using the head-mounted display device 100. Moreover, such a structure also allows the head-mounted display device 100 to be more balanced in weight on the user's head, providing better operational stability.

In this embodiment, the headband module 140 further has a communication module 146 used to receive, for example, fifth generation mobile communication signals or other wireless communication signals for communication between the host 110 and the outside world. In this embodiment, the headband module 140 may further have a head support 148 used to contact the back of the user's head to provide more stable support.

Figure 3:
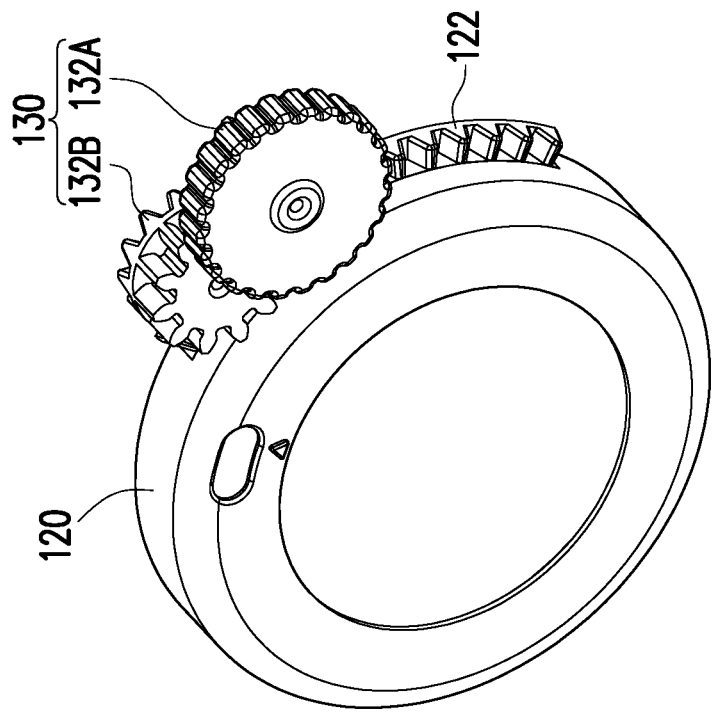
FIG. 3 is a schematic diagram of an adjustment ring and an adjustment knob of the head-mounted display device in FIG. 1.
Figure 3:
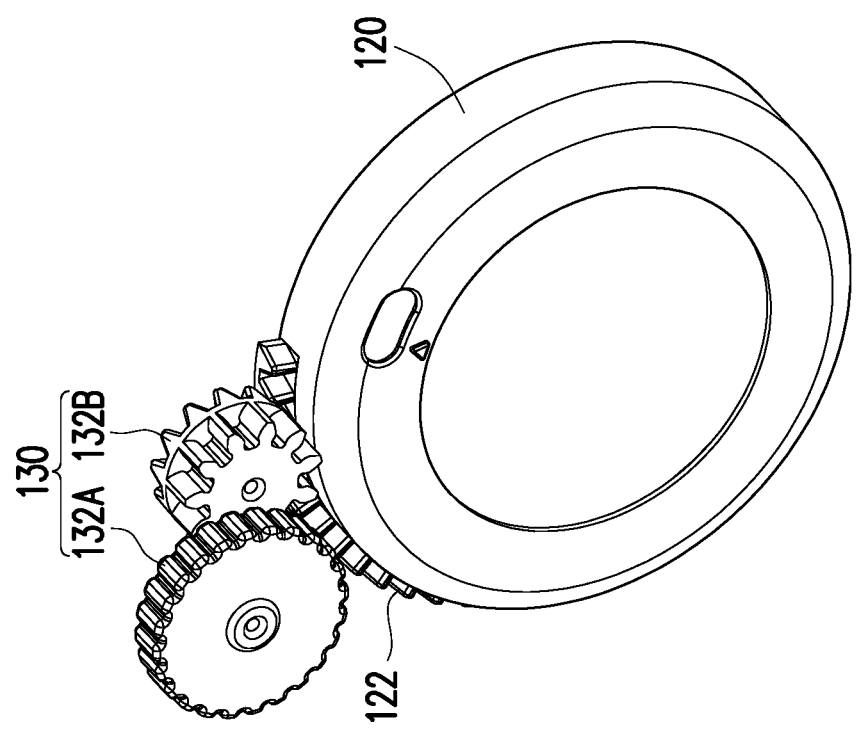

FIG. 3 is a schematic diagram of an adjustment ring and an adjustment knob of the head-mounted display device in FIG. 1. Other components of the head-mounted display device are omitted in FIG. 3 to clearly understand the coupling relationship between the adjustment rings and the adjustment knobs. Referring to FIG. 1 and FIG. 3, in this embodiment, each of the adjustment knobs 132 is a gear set. For example, each of the adjustment knobs 132 includes a gear 132A and a gear 132B. A part of the gear 132A is exposed to the outside for the user to manipulate. The gear 132A also engages the gear 132B, and gear 132B engages a rack 122 on adjustment ring 120. When the user rotates the gear 132A, the gear 132B is rotated by the gear 132A and further pivots the rack 122 to rotate the adjusting ring 120, and then the adjusting ring 120 rotates the zoom lens group 112 to perform zooming.

To sum up, in the head-mounted display device of this application, even if the face gasket is assembled to the body, the user may still perform zooming by the adjustment knobs of the face gasket, and there is no need to repeatedly remove the head-mounted display device in order to touch the zoom lens groups for zooming and then put the head-mounted display device on again to confirm whether the zoom status is ideal, which may improve the convenience of use. In addition, when combined with the detachable face gasket and headband module, the head-mounted display device may be firmly fixed on the user's head and not easily dropped. When the head-mounted display device is used in a relatively stable usage situation, the face gasket and headband module may also be removed to reduce weight, and other lightweight face gaskets may be used.

What is claimed is:

1. A head-mounted display device comprising:
    a body having two zoom lens groups corresponding to both eyes;
    two adjustment rings used to be detachably assembled to a corresponding one of the zoom lens groups, respectively; and
    a face gasket used to be detachably assembled to the body and used to contact a user's face, wherein the face gasket has two adjustment knobs, each of the adjustment knobs is used to couple a corresponding one of the adjustment rings and rotate a corresponding one of the zoom lens groups for zooming, and a part of the each of the adjustment knobs is exposed to the outside for the user to manipulate.

2. The head-mounted display device according to claim 1, wherein the each of the adjustment knobs is a gear set.

3. The head-mounted display device according to claim 1 further comprising a headband module having two opposite connecting ends used to be detachably assembled to two legs of glasses of the body.

4. The head-mounted display device according to claim 3, wherein the headband module further has a built-in battery.

5. The head-mounted display device according to claim 3, wherein the headband module further has a communication module.

6. The head-mounted display device according to claim 3, wherein the headband module further has a head support used to contact a back of the user's head.

* * * * *